Patented Sept. 12, 1933

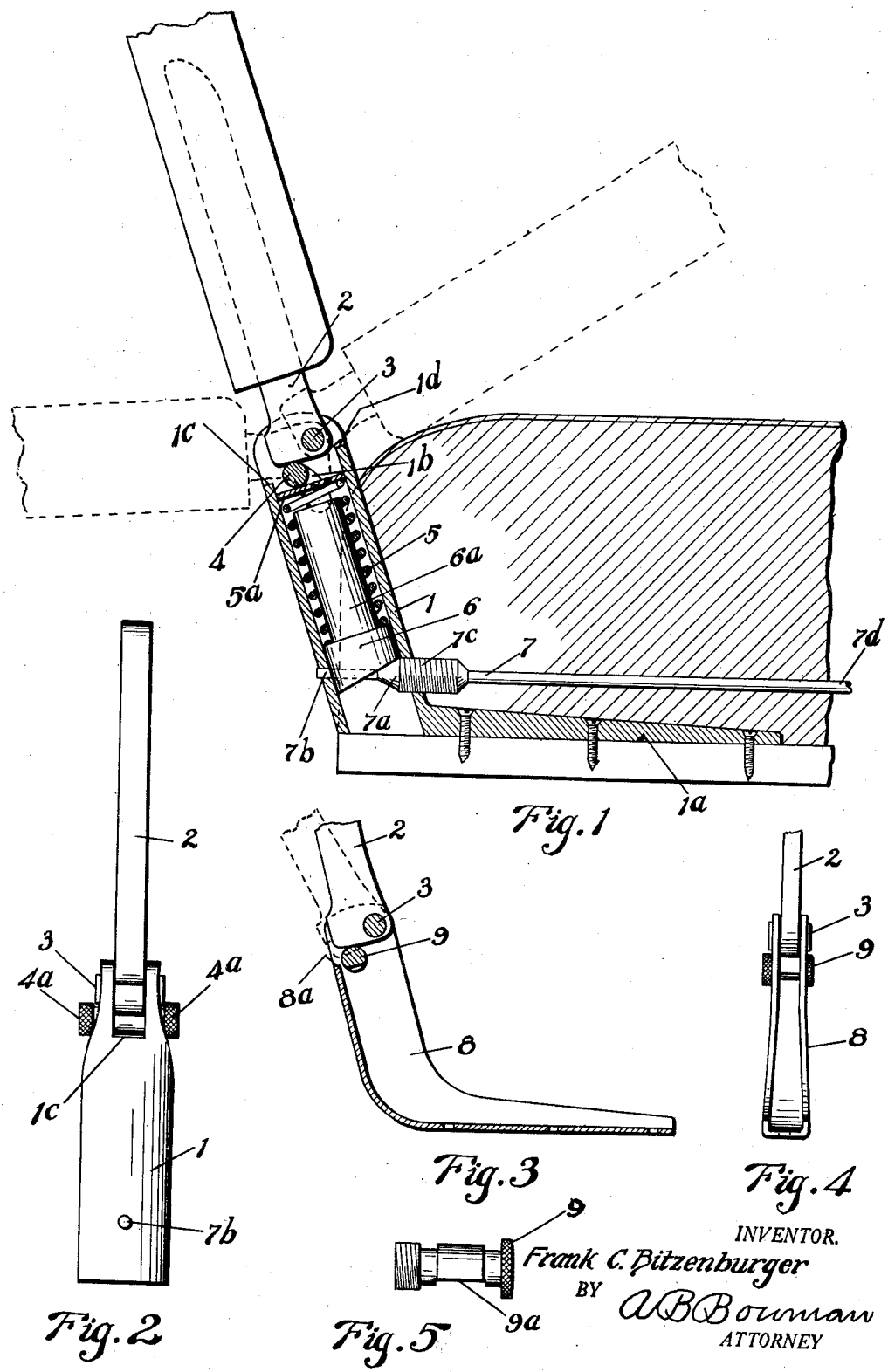

1,926,259

UNITED STATES PATENT OFFICE 1,926,259

SEAT BACK SUPPORT

Frank C. Bitzenburger, Los Angeles, Calif.

Application July 13, 1926. Serial No. 122,067

6 Claims. (Cl. 155—160)

My invention relates to back supports for seats, more particularly for automobile seats and the like, and the objects of my invention are; first, to provide an adjustable back support for seats which may be turned back down to an approximately horizontal position for a bed; second, to provide a back support for seats of this class which may be adjusted to various positions relatively to the seat for various sitting postures and also may be dropped down to a horizontal position to form a bed; third, to provide a seat structure of this class which may be tilted forwardly and backwardly to various positions between the forward and backward position; fourth, to provide a seat back of this class with yieldable means for providing a yieldable back support for seats of this class; fifth, to provide a seat structure of this class with positive stop means for holding the seat rigidly in certain positions; sixth, to provide a novel and simple back supporting means for seat structures of this class; and, seventh, to provide seat back supports of this class which are very simple and economical of construction, durable, yieldable, efficient, adjustable and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a sectional view of my seat back supporting device, showing some of the parts in elevation to facilitate the illustration, and showing varying positions of the seat back and seat back bracket by dotted lines; Fig. 2 is a rear elevational view thereof separate and apart from the seat back and seat; Fig. 3 is a partial sectional and elevational view of the device in a slightly modified form; Fig. 4 is a front elevational view thereof, and Fig. 5 is a side elevational view of the eccentric stop pin for supporting the seat back in various positions.

Similar characters of reference refer to similar parts and portions throughout the several views of the drawing.

The seat back supporting member 1, back supporting bracket 2, pin 3, pin 4, spring 5, adjusting member 6 and adjusting member 7 constitute the principal parts and portions of my seat back supporting apparatus in one form.

The supporting member 1, as shown in Figs. 1 and 2 of the drawing, is a hollow cylindrical member provided with an extended portion 1a adapted to be secured to the upper side of the seat under the upholstering. Pivotally mounted in the upper end of the cylindrical portion is the back support or back supporting bracket 2, which is preferably a metallic member, which is adapted to be secured to the lower side of the back portion, it being noted that it is desired to use two of the supporting apparatus with each seat back in spaced relation to each other. This support 2 is provided with an extended lug portion which is provided with a hole near one side through which is inserted a pin 3 which is secured through the member 1 near the upper side. This member 1 is provided with a curved slot 1b in which is shiftably mounted a pin 4 which is provided with heads 4a on its opposite ends, one or both of which may be screwed thereon for holding the pin in position. This pin is supported by means of a washer 5a which rests upon the upper end of a compression spring 5. The other end of the spring is supported by means of a beveled member 6 which is provided with an upwardly extending portion 6a which fits into the spring 5 and serves as a guide for said spring. The lower edge of this member 6 is beveled and engaging this beveled lower edge is a screw adjusting member 7 which is provided with a conical portion 7a which engages the lower beveled surface of the member 6 and is provided with an extended reduced portion 7b which extends through a slot in the one side of the member 6 and through a hole in the back side of the cylinder member 1, serving as a guide and support for the member 7. This member 7 is provided with a thread 7c which fits into threads in the member 1 so that the conical portion 7a may be shifted inwardly and outwardly in the member 1 which adjusts the spring 5, it being noted that the member 7 is provided with an extended portion 7d which extends forwardly to the front of the seat to facilitate the adjustment of the spring. This member 1 is provided with stop portions 1c and 1d which serve as positive stops for the member 2 for shifting to horizontal positions backwardly and forwardly.

In the modified form of construction shown in Figs. 3, 4 and 5, the spring 5 is omitted as well as the adjusting means for the spring and the washer 5a. Therefore, the support 8 may be U-shaped in cross section and the front side open, making a very simple support to make.

The member 2 is pivoted in this support in the same manner as that in Fig. 1. The member 2, however, is supported in this structure by means of a pin 9 which is provided with a flat portion 9a so that the pin serves as an eccentric stop so that when the pin 9 is turned in the support 8, the member 2 may be shifted to varying positions. In order to turn the member 2 down to a horizontal position, to serve as a bed, the pin 9 is removed and the member 2 then turns down against the stop portion 8a and the member 8, thus providing a positive support for the back rest in varying adjusted positions.

Though I have shown and described a particular construction, combination and arrangement of parts and portions and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In seat back supports, a supporting member secured to the seat provided with an upwardly extending portion, a seat back bracket pivotally mounted on the upwardly extending portion of said supporting member and provided with an offset portion, a removable pin in said supporting member engageable by and supporting said offset portion, said pin being adjustable and provided with a seat back supporting portion adapted to be shifted to various positions with the pin for supporting the seat back bracket in various back supporting positions, and a stop portion on said support adapted to engage said bracket serving as a positive stop for holding said bracket in a horizontal position when the pin is removed from its back supporting position.

2. In seat back supports, a supporting member, a seat back bracket pivotally mounted thereon and provided with an extended portion, and a pin supported in said supporting member for variably engaging the extended portion of said bracket for variously supporting said bracket relative to the supporting member, said pin being slidable and resiliently yieldable in said supporting member transversely to the longitudinal axis of the pin, the various shifted positions of the pin determining the various supporting positions of the seat back bracket.

3. In seat back supports, a supporting member, a seat back bracket pivotally mounted thereon and provided with an extended portion, a pin readily removably and shiftably supported in said supporting member, said pin being provided with engaging portions engaging the extended portion of said bracket for supporting said bracket in certain extreme and intermediate back supporting positions relative to the supporting member, a stop portion on said supporting member adapted to engage said bracket, serving as a positive stop for said bracket, when said pin is removed, for supporting the seat back bracket in a horizontal position, and resilient means for supporting said removable pin in resilient relation to the extended portion of said bracket, said resilient means supporting said back bracket in various back supporting positions.

4. In seat back supports, a supporting member secured to a seat, a seat back bracket mounted on said supporting member, a removable pin mounted in said supporting member and engaging said bracket for supporting said bracket on said supporting member, a spring in said supporting member bearing against one side of said pin, and cam means in said supporting member at the opposite end of said spring for varying the tension of the latter.

5. In seat back supports, a supporting member secured to a seat, a seat back bracket mounted on said supporting member, a shiftable pin yieldably and resiliently mounted in said supporting member and engaging said bracket and yieldably supporting said bracket on said supporting member in a back supporting position, said pin being shiftable clear of the bracket, and a positive stop portion on said support for engaging said bracket when said pin is shifted clear of the bracket and when said bracket is turned backwardly to a horizontal position.

6. In a seat structure, a seat, a supporting bracket in connection therewith, a back supporting bracket shiftably mounted relative to the first bracket, a spring in connection with both of said brackets for resiliently supporting the back supporting bracket relative to the first bracket, and combined adjusting means for adjusting said spring and for serving as a variable stop for the backward position of said back supporting bracket.

FRANK C. BITZENBURGER.